United States Patent [19]

Heimbach

[11] Patent Number: 4,638,357
[45] Date of Patent: Jan. 20, 1987

[54] AUDIO SCRAMBLER
[75] Inventor: Paul A. Heimbach, New York, N.Y.
[73] Assignee: Home Box Office, Inc., New York, N.Y.
[21] Appl. No.: 572,445
[22] Filed: Jan. 20, 1984
[51] Int. Cl.[4] .................... H04M 1/70; H04N 7/67
[52] U.S. Cl. .................................. 358/121; 358/118
[58] Field of Search .......................... 358/118, 121; 179/1.5 S, 1.5 M

[56] References Cited
U.S. PATENT DOCUMENTS

| | | |
|---|---|---|
| 1,526,335 | 2/1925 | Griggs . |
| 1,533,311 | 4/1925 | Fletcher . |
| 1,542,567 | 6/1925 | Mathes . |
| 1,634,390 | 7/1927 | Zworykin . |
| 1,709,901 | 4/1929 | Espenschied et al. . |
| 1,752,485 | 4/1930 | Harlety . |
| 2,406,825 | 9/1946 | French . |
| 2,411,683 | 11/1946 | Guanella . |
| 2,510,046 | 5/1950 | Ellett et al. . |
| 2,547,598 | 4/1951 | Roschke . |
| 2,551,068 | 5/1951 | Striker . |
| 2,563,448 | 8/1951 | Aram et al. . |
| 2,567,539 | 9/1951 | Aram . |
| 2,570,187 | 10/1951 | Aram . |
| 2,570,188 | 10/1951 | Aram et al. . |
| 2,574,462 | 11/1951 | Brown . |
| 2,656,406 | 10/1953 | Gray et al. . |
| 2,816,156 | 12/1957 | Pawley et al. . |
| 2,823,252 | 2/1958 | Bridges . |
| 2,852,598 | 9/1958 | Roschke . |
| 2,872,507 | 2/1959 | Druz . |
| 2,881,244 | 4/1959 | Pawley et al. . |
| 2,882,398 | 4/1959 | Adler . |
| 2,890,269 | 6/1959 | Druz . |
| 2,896,071 | 7/1959 | Druz et al. . |
| 2,905,747 | 9/1959 | Kidd et al. . |
| 2,929,865 | 3/1960 | Van Jepmond . |
| 2,947,804 | 8/1960 | Eilers et al. . |
| 2,952,735 | 9/1960 | Weiss . |
| 2,956,110 | 10/1960 | Shanahan ........................ 358/118 |
| 2,961,482 | 11/1960 | Wieselman et al. . |
| 2,983,782 | 5/1961 | Druz . |
| 2,987,576 | 6/1961 | Druz et al. . |
| 2,993,959 | 7/1961 | Druz et al. . |
| 3,054,857 | 9/1962 | Weiss . |
| 3,059,054 | 10/1962 | Reiter .............................. 358/121 |
| 3,175,033 | 3/1965 | Blonder et al. . |
| 3,187,091 | 6/1965 | Quan et al. . |
| 3,231,818 | 1/1966 | Court . |
| 3,236,941 | 2/1966 | Sagall . |
| 3,268,815 | 8/1966 | Banach . |
| 3,336,439 | 8/1967 | Banning, Jr. . |
| 3,381,223 | 4/1968 | Nakamura et al. . |
| 3,610,828 | 3/1973 | Girard et al. . |
| 3,688,193 | 8/1972 | McDonald ........................ 179/1.5 M |
| 3,723,878 | 3/1973 | Miller . |
| 3,773,977 | 11/1973 | Guanella . |
| 3,813,482 | 5/1974 | Blonder . |
| 3,813,493 | 5/1974 | Hughes et al. . |
| 3,852,534 | 12/1974 | Tilk . |
| 3,885,089 | 5/1975 | Callais et al. . |
| 3,893,031 | 7/1975 | Majeau et al. . |
| 4,020,285 | 4/1977 | Branscome et al. . |
| 4,045,814 | 8/1977 | Hartung et al. . |
| 4,074,311 | 2/1978 | Tanner et al. . |
| 4,081,831 | 3/1978 | Tang et al. . |
| 4,081,832 | 3/1978 | Sherman . |
| 4,215,366 | 7/1980 | Davidson ........................ 358/121 |
| 4,222,067 | 9/1980 | Stern et al. ..................... 358/118 |
| 4,266,243 | 5/1981 | Shutterly . |
| 4,313,133 | 1/1982 | Fukushima ..................... 358/118 |
| 4,323,922 | 4/1982 | Toonder et al. ................ 358/118 |
| 4,447,828 | 5/1984 | Toonder ......................... 358/118 |

Primary Examiner—Stephen C. Buczinski
Attorney, Agent, or Firm—Wayne M. Kennard

[57] ABSTRACT

A method and apparatus are disclosed for scrambling and descrambling an audio signal. An interference signal is generated and is intermittently, preferably pseudo-randomly, added to the program audio as a function of control information generated either by means of hardware alone or by means of software. The scrambled audio and the interference signal are preferably transmitted on two carriers, e.g., two standard subcarriers used in TV broadcasting, together with the control information. A decoder descrambles the audio by substracting the interference signal from the scrambled audio at the proper times as indicated by the control information. Preferably, the interference signal, comprising a series of noise bursts, is transmitted on the same carrier as the control information, time-multiplexed with the latter. Alternatively, the program audio itself, subjected to a time delay, is used as the interference signal, in which case the second carrier bears only the control information.

10 Claims, 8 Drawing Figures

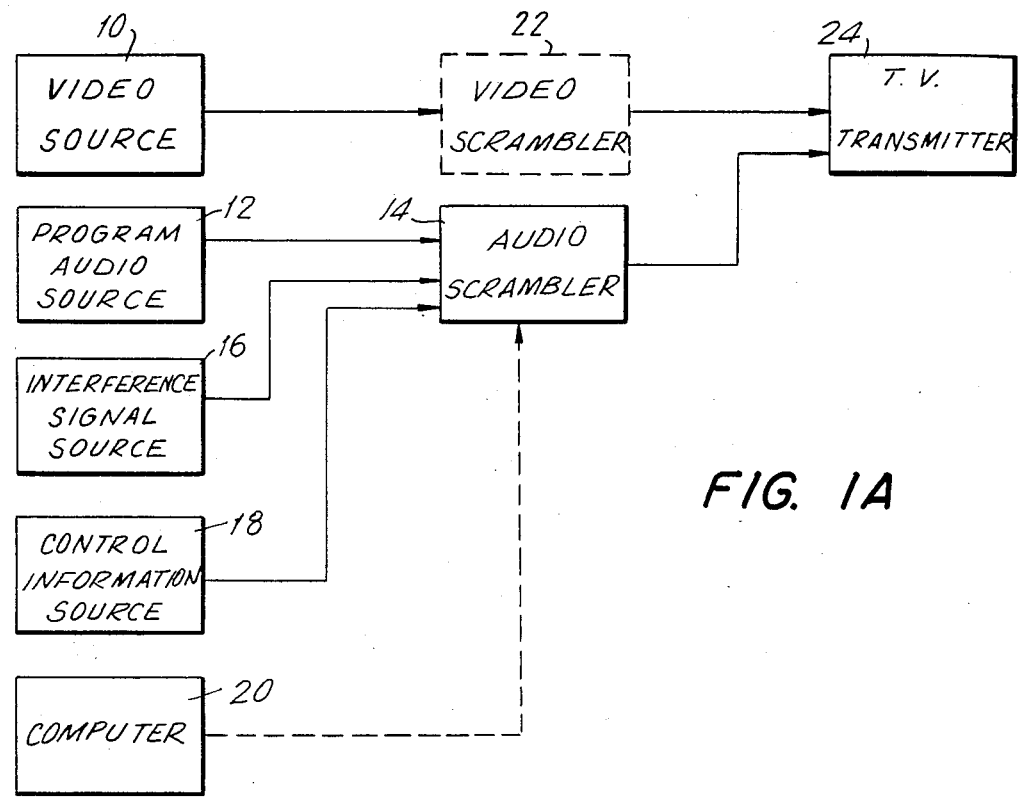
FIG. 1A
FIG. 1B
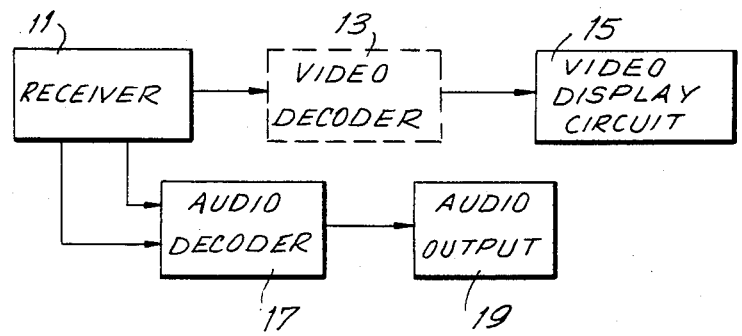

AUDIO SCRAMBLER

BACKGROUND OF THE INVENTION

The present application pertains generally to audio scramblers, and pertains more particularly to scramblers intended for use with pay television or similar systems.

With the advent of large scale cable TV and multipoint distribution systems, it has become increasingly important to prevent the unauthorized use of such systems. The usual method for doing so is to scramble at least part of the signal provided to the system's subscribers. It is most common to scramble the video signal. This, however, has proved not always sufficient, since some unauthorized users find the audio satisfactory by itself, even if the video is unusable. Some systems which scramble the audio signal instead of, or in addtion to, the video signal are known. Such systems, however, are usually relatively complex and expensive. Many such systems involve dividing the audio signal into several frequency subbands and scrambling them. This approach is quite costly. Another approach involves scrambling one or both signals in accordance with a simple pattern built into both the transmitter and a unit installed in the subscriber's home. Unfortunately, it has often proved relatively easy for an enterprising unauthorized person to identify the pattern and build a reception unit that will serve as well as one provided by the broadcaster. Still another approach has been to add a random noise signal or interfering signal in random phase to the audio, and to broadcast the noise on a separate channel, or subcarrier, the subscriber's unit substracting the noise signal from the audio. A variation of this approach involves adding a random-phase noise or interfering signal to the audio signal only at random or pseudo-random times, and sending an additional signal to cause the reception unit to substract the noise signal from the scrambled audio signal at the proper times. It has also been proposed to provide such information of an unused portion of the video signal, for example, the back porch. This, however, is somewhat cumbersome.

It is the principal object of the invention to provide a simple and economical audio scrambler system and decoder exempt from the above described shortcomings and well suited for use on a large scale in a pay television or similar system.

Another object of the invention is to provide such a system in which the audio scrambling is entirely independent of the video signal, so that the system of the invention can be used either with or without any selected video scrambling system.

Still another object of the invention is such an audio scrambling system in which the scrambling involves frequent and effectively unpredictable changes, to hamper unauthorized unscrambling.

Still another object of the invention is to provide an audio scrambler in which information, preferably coded, used to control unscrambling is transmitted on the same subcarrier as a noise signal used in scrambling, or on a separate subcarrier, or within a video signal transmitted with the audio signal.

Yet another object of the invention is to provide an audio scrambling system fulfilling the above objects, and enabling the broadcaster to address individual decoders to specify the type or types of service the owner of the addressed decoder is authorized to receive, and to disable the addressed decoder if service to its owner is to be suspended.

SUMMARY OF THE INVENTION

The method of the invention comprises generating the program audio signal in the conventional way, and generating a signal for use as a noise or interference source. The noise signal can be any suitable audio signal, and preferably comprises a series of bursts of noise produced by any suitable means, such as a noise generating diode. The noise signal is added to the program audio signal at random or pseudo-random times determined in any suitable manner by hardware or software, and preferably with pseudo-random signal phase reversals of the original noise signal as well. Unscrambling is done by means of subtracting the noise signal (which is transmitted to the subscribers on a subcarrier) at the proper times and with any necessary phase-reversals. Control information from which to determine the proper times to subtract the noise signal and to reverse phase is transmitted to the subscribers' decoders on the same subcarrier as the noise bursts, in the intervals between bursts. Alternatively, the control information can, if desired, be transmitted on a separate subcarrier or on an accompanying video signal. Preferably, the actual scrambling is carried out as a function of pulses derived by specified arithmetic or logic operations, or both, performed on a seed, i.e., on a predetermined set or unit of information. Identical hardware or software in the scrambler system and in the decoder perform the specified operations simultaneously. The only control information normally required is the seed, which is preferably changed from time to time.

Preferably, the noise bursts are varied in amplitude roughly in proportion to the program audio level.

In another version, the program audio signal itself is used as the noise signal by being fed back into the audio signal with a delay. The randomness of the scrambling consists of selectively feeding back or not feeding back the program audio signal to itself at a given time. The unscrambling process consists of substracting the program audio from itself with the same delay and at the corresponding times as in the encoding process. The noise signal is not transmitted separately from the scrambled program audio, and control information can be preferably transmitted continuously.

In either of these embodiments when it is desired to change the package of programming a particular subscriber is authorized to receive, the control information includes a command addressed to that subscriber's decoder changing an authorization code stored in a memory device in the decoder.

If desired, part or all of the control information is encrypted.

The apparatus of the invention includes a transmitting system and a decoder system. The transmitting system includes means for producing an interference or a noise signal, and means for summing the interference and the program audio signals, preferably with further random or pseudo-random modifications of the interference signal before the summing. Control logic circuitry or software is used to generate a digital code signal indicating at what times the interference signal is to be added to the program audio signal. The decoder includes logic circuitry which receives control information from the transmitting system, from which the decoder determines when the interference signal is to be subtracted from the scrambled audio signal, and what, if any, modifications must be made to the interference signal before subtracting, to compensate for those made at the transmitter before summing. Preferably, the interference signal is another audio signal transmitted on a subcarrier with the control information on the same subcarrier, time-multiplexed with bursts of interference.

Preferably, the decoder includes memory circuitry containing an address unique to that decoder, and containing an authorization code signifying which of several classes or levels of service the subscriber in question is authorized to receive. The transmitting system is adapted to generate and transmit, as part of the control information, a command addressed to particular decoder, changing the authorization code of that decoder.

A level detecting circuit is preferably also provided in the transmitting system to track the program audio signal level, to keep the noise signal level approximately proportional to the program audio signal level.

These and other objects and features of the invention will be more thoroughly understood upon consideration of the following detailed description of several preferred embodiments, taken together with the accompanying figures, in which like reference characters refer to like elements.

BRIEF DESCRIPTION OF THE FIGURES

FIGS. 1A and 1B are block diagrams of a transmission and a reception system, respectively, according to the invention.

DETAILED DESCRIPTION OF THE PREFERRED EMBODIMENTS

Figure 2:
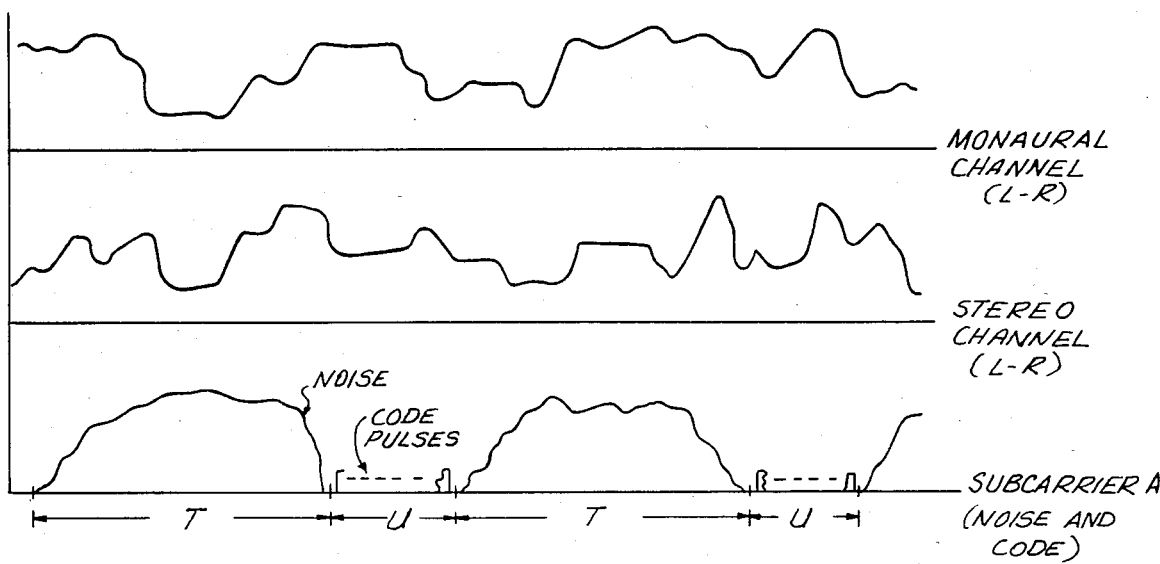
FIG. 2 is a rough timing diagram illustrating the form of the noise signal and the timing of control information according to one preferred embodiment of the invention.

FIGS. 1A and 1B are, respectively, block diagrams of a transmission circuit and of a television receiver circuit incorporating the present invention. The transmission circuit shown in FIG. 1A includes a video signal source 10 and a program audio source 12. An audio scrambler 14 conditions an interfering signal 16 as described below and, under the control of an external computer system 20, intermittently adds the interfering signal to the program audio signal. The audio scrambler 14 also modulates a subcarrier with the interference signal and with control information which, as described below, enables authorized subscribers to unscramble the program audio. In addition, if the broadcaster using the scrambling system of the invention offers several different levels or classes of programming to subscribers, the control information can include commands changing the class or level of programming a particular decoder can unscramble. Logic circuitry, or a second computer, is shown as the source of the control information and is indicated in FIG. 1A by block 18, although the control information could be generated by computer 20.

The scrambled program audio and the modulated subcarrier along with the video signal are modulated by a TV transmitter or modulator 24 in the conventional way. The video signal, if desired, can also be scrambled (as indicated in phantom in FIG. 1A at 22) and after modulation, is transmitted in the usual way.

In the most preferred embodiment, the interference consists of a series of bursts of noise, as shown in FIG. 2. Element 18 in this case generates a train of code pulses bearing the control information between each two consecutive noise bursts.

The scrambler 14, in this embodiment, superimposes the interference on the program audio signal at pseudo-random times. The times at which this is done are determined in a manner described below as a function of the control information carried by the code pulses. The combined signal is broadcast by means of a transmitter 24, either through the air or by means of a cable network or the like.

As shown in FIG. 1B, a television set receiving a signal scrambled according to the invention includes a circuit 11 that first separates the audio and video portions of the incoming signal. The video signal, if scrambled, is decoded by a suitable circuit 13 and is then displayed on the television screen by a conventional video display circuit 15. In normal operation, the scrambled audio signal and the interference signal are used by the audio decoder 17 to provide an unscrambled audio signal. This is done by subtracting the interference signal from the scrambled audio signal at times determined by the code pulses transmitted between the bursts of noise of the interference signal. The unscrambled audio signal is then used to drive a conventional audio output 19.

FIG. 2 is a rough timing diagram illustrating generally the arrangement of the program audio signal and the interference signal according to the most preferred embodiment. FIG. 2 shows two conventional audio channels, the standard monaural FM channel ("L+R", containing both the right and the left channels, when the recording is done in stereo), and the conventional stereo signal ("L−R", consisting of the difference between the left and the right channels). The interference signal is preferably broadcast on a standard subcarrier, e.g., subcarrier A, and is divided into a series of segments of predetermined lengths T and U as indicated in FIG. 2. Each segment T contains a burst of interference, which is produced and transmitted during part or all of segment T as described below, and is followed by a second period, of duration U, during which no interference is transmitted. During the period U, the code pulses are transmitted on the subcarrier.

Figure 3:
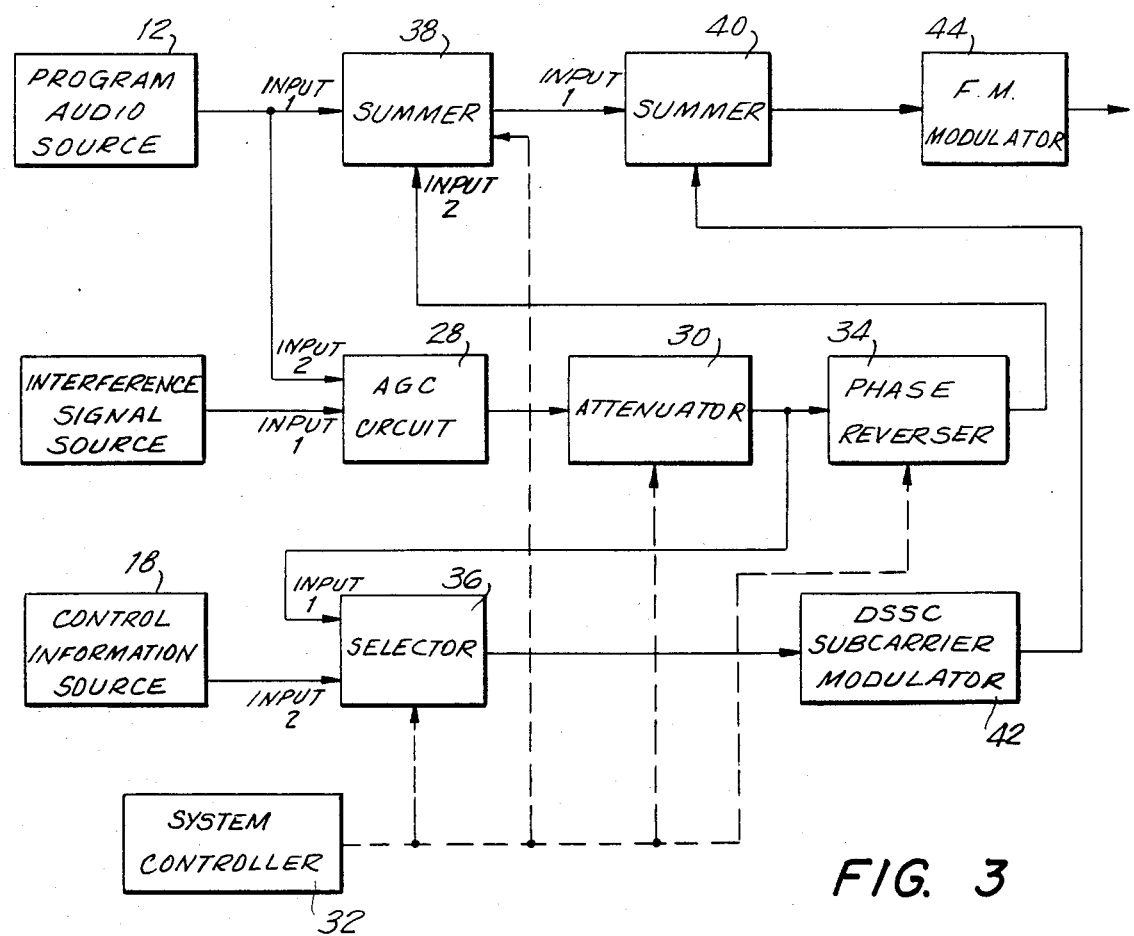
FIG. 3 is a block diagram of one preferred embodiment of an audio scrambler according to the present invention.

FIG. 3 is a block diagram of audio scrambler 14. A noise or interfering audio signal or a band limited signal in the audio range is produced by a circuit 16, which can be any circuit that will provide a signal which, sumperimposed upon a program audio signal, will cause the latter to produce unintelligible sounds when used to drive an audio output. The interference signal is applied to input 1 of an automatic gain control circuit ("AGC") 28. The program audio is applied to input 2 of AGC 28 and is used to adjust the signal level of the interfering audio signal as the latter appears at the output of the AGC 28, the signal output level of the AGC 28 being proportional to the level of the signal at input 2. If the program audio level is high, the AGC 28 will exhibit a high-level output; if the program audio level is low, the AGC 28 will exhibit a low-level output.

The output of the AGC 28, which is the level-adjusted noise or interfering audio signal, is applied to the input of an attenuator 30. The attenuator 30, under the control of the system controller 32 (which can be part of computer 20 or, as shown, can be a distinct unit under the control of computer 20), adjusts the signal level of the interference signal between specified minimum and maximum signal levels (respectively "no signal" and "full signal" hereinafter) during each time segment T, causing the audio signal to change gradually from no signal to full signal and from full signal to no signal. (The exact rise and fall of the signal level output by the attenuator 30 depends, of course, on time constants built into the attenuator circuit.) The signal controller 32 also controls the length of time during which a signal is present at the attenuator output, and the time during which no signal is present there.

The output of the attenuator 30 is applied to the input of a signal phase reverser 34 and to one input of a signal selector 36. The function of the signal phase reverser 34 is to reverse the phase of the attenuator output by 180 degrees. The action of the signal phase reverser 34 is begun and terminated at times determined by the system controller 32.

The output of the signal phase reverser 34 is applied to one input of a summer 38, which adds that signal at some times but not at others to the program audio signal. Whether the interfering signal is or is not added to the program audio signal at a given time is controlled by the system controller 32. Thus, the signal output by summer 38 is sometimes the program audio alone and sometimes the sum of the program audio and the interfering signal as conditioned by the AGC 28, the attenuator 30 and the signal phase reverser 34.

The output of attenuator 30 is applied to input 1 of the selector 36. The control information is applied to input 2 of selector 36. The control information consists preferably of an audio frequency shift key signal, a multiple tone audio tone signal or on-off keying of a single audio tone. The selector 36, under the control of the system controller 32, outputs either the signal at input 1 or the signal at input 2. Input 1 is selected during the time a signal is present at the output of the attenuator 30.

The output of the selector 36, which is the combination of noise and code pulses indicated in FIG. 2, is applied to a double sideband suppressed carrier modulator or other suitable modulator 42 and is used to modulate a carrier wave. The frequency of the carrier wave is placed above the audio baseband frequencies, for example, at standard subcarrier frequencies used for FM stereo transmission or for FM SCA transmission. The output of the modulator 42 is added to the output of summer 38, i.e., to the scrambled audio signal, by summer 40. The output of summer 40 is used to frequency modulate the TV channel audio carrier in the normal manner at 44.

The system controller 32 controls the action of attenuator 30, signal phase reverser 34, selector 36 and summer 38, controlling the state of each of those circuits, the timing of the changes of state and the duration of states. The states and duration of states of each function are varied in patterns sufficiently complex to be effectively unrecognizable. All state transitions of phase reverser 34 and selector 36 preferably occur while no signal is present at the output of the attenuator 30.

All pseudo-random changes of state are performed as a function of the results of specified logic or arithmetic operations (or both) carried out on a predetermined starting datum, or seed, e.g., a predetermined sequence of a certain number of binary bits. The specified operations are performed simultaneously by the controller 32 or computer 20 and by hardware or software in the decoder. When a new seed is to be substituted for an old one, the new seed is transmitted to the decoders as part of the control information. This, together with suitable synchronization signals (well within the skill of those in the art), is the only control information needed for unscrambling. All other control information is for a different purpose, as described below.

Figure 4:
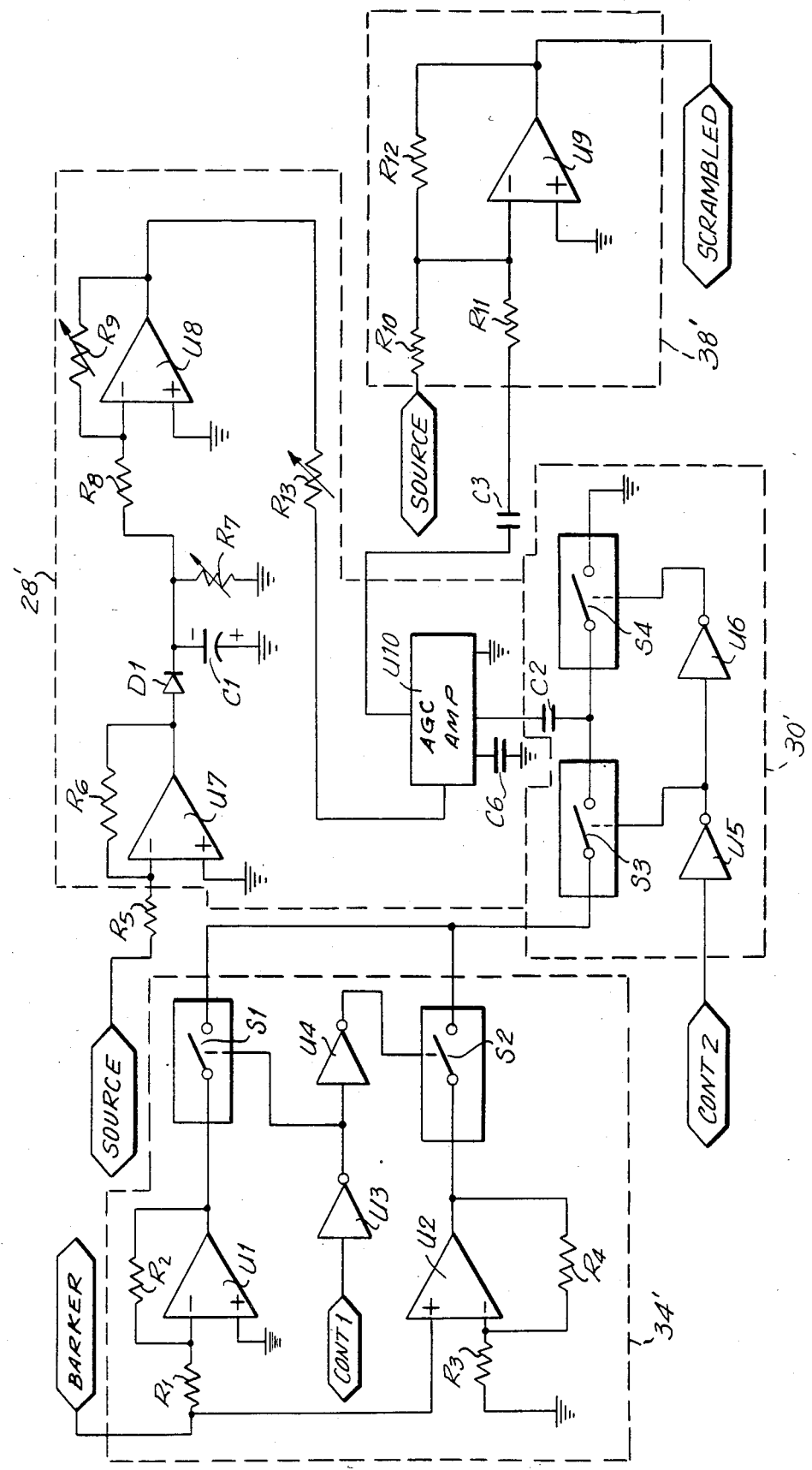
FIG. 4 is a schematic diagram of a variant of the audio scrambler circuit of FIG. 3.

FIG. 4 is a schematic circuit diagram showing a portion of an audio scrambling circuit 14' that is a slight variation of, and could be used in place of, that of FIG. 3. As can be seen, circuit 14' includes a phase inverter 34', an attenuator 30', an automatic level control circuit 28' and a summer 38'. The inverter 34' comprises two amplifiers $U_1$ and $U_2$, the output of each of which is applied to a respective solid state switch S1, S2. The outputs of S1 and S2 are connected in parallel to serve as the inverter output. Each amplifier U1 and U2 is connected in well-known manner such that amplifier U1 inverts the input signal and amplifier U2 does not invert the input signal. Resistors $R_1$, and $R_2$, $R_3$ and $R_4$ set the gain of amplifiers $U_1$ and $U_2$, using standard operational amplifier circuit techniques. With this arrangement, signals applied to the non-inverting input emerge from the amplifier with the same phase as when input, while signals applied to the other input undergo phase inversion.

As can be seen, a barker signal, which is simply a suitably generated interference signal filtered by a low pass filter, is applied via resistor R1 to the inverting input of amplifier U1 and directly to the non-inverting input of amplifier U2. A control signal supplied by the computer 20 or other control unit, and indicated by CONT 1, is applied via a buffer amplifier U3, which inverts the signal, to the first switch S1. The inverted signal output by amplifier U3 is reinverted by an additional amplifier U4 and is then applied to switch S2. As a result, when the control signal CONT 1 has one polarity, the first switch S1 is open and the second switch S2 is closed, so that the uninverted barker signal as amplified by amplifier U2 appears at the output of the phase inverter circuit 34'. When the control signal CONT 1 has the opposite polarity, then the inverted barker signal is passed by the closed first switch S1 and appears at the inverter output.

The signal output by the phase inverter 34' is applied to one input of attenuator 30'. The latter comprises two solid state switches S3, S4 connected in series. The other terminal of switch S3 is the selector input, and the other terminal of switch S4 is grounded. The two switches S3, S4 are controlled by a second control signal CONT 2. The second control signal is applied to an inverting amplifier U5, which inverts the polarity and serves as a buffer. The inverted signal is applied to the control input of switch S3. An additional inverting amplifier U6 reinverts the control signal CONT 2 and applies it to the control input of switch S4. The output of attenuator circuit 30' causes the input to AGC amplifier U10 to be the output of circuit 34' (with S3 closed and S4 open) or to be grounded (with S4 closed and S3 open). The polarity of CONT 2 controls whether the noise signal appears at the output of circuit 30', or whether that output is simply a zero level signal (grounded).

The barker signal, either inverted or not inverted depending on the first control signal CONT 1, is level-controlled by AGC circuit 28' as a function of the instantaneous level of the program audio signal. The input by which the barker signal is applied to the AGC circuit 28' is connected by capacitator C2 to the output of attentuator 30'. Depending on the polarity of the second control signal CONT 2, the barker signal may or may not be applied to the AGC circuit 28'. When the barker signal is not applied to the AGC circuit 28', the latter is grounded via switch S4, causing the attenuator output to be a zero level signal. This is done periodically to provide an interval in which the control information pulses can be transmitted on the subcarrier being used to carry the interference.

During the time intervals when the barker signal is applied to the AGC circuit 28', the gain is controlled by means of a signal that is a function of the signal level of the program audio signal.

As can be seen, the program audio signal is applied via a resistor R5 to the inverting output of an amplifier U7, which input is connected by a resistor R6 to the amplifier output. The non-inverting input is grounded. The amplifier output is applied to a diode D1, which is connected to ground across capacitor C1 and resistor R7 in parallel. The voltage across resistor R7 is applied to the inverting input of another amplifier U8, whose biasing circuit consists of two resistors R8, R9 arranged in the same manner as those of amplifier U7. The output of amplifier U8 is applied via another resistor R13 to the second input of the AGC amplifier U10.

The program audio signal is amplified by circuit U7 to a level sufficient to cause diode D1 to conduct, charging capacitor C1. The circuit consisting of R7 and C1 produces an envelope signal representative of the present level of the program audio signal, in a manner like the detection of an AM radio signal. The envelope signal is further amplified by amplifier U8 and applied to the AGC amplifier U10 to control the degree of attenuation to which the interference signal applied to the AGC 28' via capacitor C2 is subjected.

Summer circuit 38' consists of an amplifier U9 with the non-inverting input grounded, and the inverting input connected via resistor R12 to the output. The signals to be summed are applied to the inverting input via respective resistors R10 and R11. A capacitor C3 connects resistor R11 to the AGC output. Thus, the signal output by AGC 28', consisting at different times of the attenuated barker signal or of no signal, is applied via capacitor C3 to one input of the summer 38', and the program audio signal is applied to the other summer input. The output of summer 38' is the scrambled audio signal.

Figure 5:
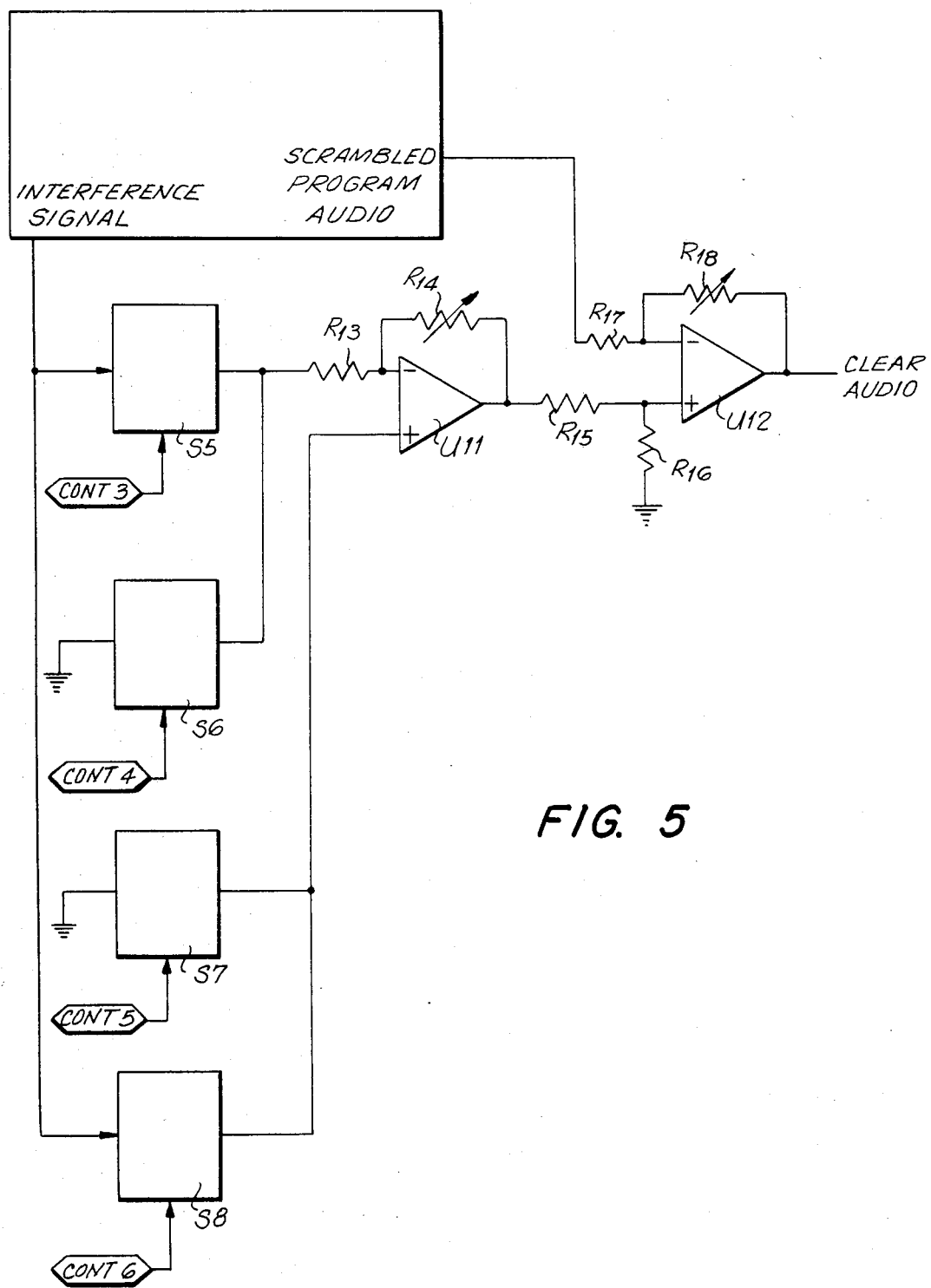
FIG. 5 is a schematic diagram of a decoding circuit according to the invention.

FIG. 5 shows a portion of the preferred embodiment of the decoder circuit of the invention, suitable for use with the scrambling circuits of FIGS. 3 and 4. The interference signal, with the code pulses in the intervals between bursts, is applied to a terminal of each of two solid state switches S5 and S8. The other terminal of switch S5 is connected via R13 to the inverting input of amplifier U11, and the other terminal of switch S8 is connected to the non-inverting input of amplifier U11. The inverting input of amplifier U11 is connected to the output of amplifier U11 by R14 for biasing amplifier U11 in a conventional manner. Two additional switches S7 and S6 connect the respective inputs of amplifier U11 to ground. Control signals CONT 3, CONT 4, CONT 5 and CONT 6 are applied to the control inputs of the four switches S5-S8. Control signals CONT 3 and CONT 4 are complementary in polarity and determine whether the interference signal is or is not applied to the inverting input of the amplifier U11. Similarly, the two remaining control signals CONT 5 and CONT 6 are of complementary polarity and control whether or not the interference signal is applied to the non-inverting input.

The four control signals CONT 3-6 are generated by logic circuitry (or by a microprocessor programmed with equivalent software) in the decoder in such a manner that the interference signal is applied in turn to the inverting input, the non-inverting input, or neither input of amplifier U11, to cause the latter to output a signal consisting entirely of the interference bursts, instantaneously inverted or not inverted exactly as the interference signal was inverted or not inverted in the scrambling circuit. The resulting signal is applied via R15 across resistor R16 to the non-inverting input of another amplifier U12 biased by R18 in the same general manner as amplifier U11. The scrambled program signal is applied via resistor R17 to the inverting input of amplifier U12. The latter subtracts the two signals input to it. The output of amplifier U12 is the unscrambled program audio signal.

At or shortly after the beginning of each time segment U, the computer 20 or system controller 32 preferably generates a signal (for example, a series of digital pulses) that indicates to the decoders that a burst of noise has been completed and that what follows is control information. This can also be done to ensure synchronization of the scrambling and the unscrambling devices. Alternatively, high-pass and low-pass filters connected in parallel can be used by the decoder to extract the control information and the noise bursts, respectively, from the interference signal.

The phase reversals of the interference signal, and the addition or non-addition of the interference to the program audio signal, are preferably or pseudo-random. According to the most preferred version of the invention, these functions are pseudo-random and are controlled in the scrambler as a function of signals produced by special logic circuitry or appropriate software from a seed. Preferably, the seed is a sequence of binary bits that is subjected iteratively to specified logic or arithmetic operations to generate an on-going series of binary pulses whose polarity varies from pulse to pulse in a pattern too complex to be readily recognized. These pulses are used to produce the control signals CONT 1 and CONT 2 discussed in connection with FIG. 4, or to produce corresponding signals to control the scrambler 14 of FIG. 3 or any other embodiment of the scrambler circuit of the invention.

Similar hardware or software in the decoder uses the same seed to produce control signals (those identified as CONT 3-6 in FIG. 5) to condition the interference bursts and subtract them from the scrambled program audio as described above. The logic or arithmetic operations performed by the scrambler on the seed in producing the control signals are also functions of the authorization code which the decoders authorized to unscramble the program in question must have. (In the decoders, the actual authorization code of the decoder in question is used.) If the subscriber in question is authorized to receive the program being transmitted, the operations carried out on the seed and the authorization code will yield the correct control signals to unscramble the program audio; otherwise, the control signals generated at the decoder will be different from those required for unscrambling, and the subscriber will hear only a garbled version of the program audio.

It is desirable to change the seed from time to time to increase security. This is done simply by transmitting a new seed in the interference signal, in an interval between noise bursts. The seed is preferably preceded by a special sequence of pulses to alert the decoders that a new seed is about to be transmitted.

When it is desired to change the authorization code of a particular decoder, the computer 20 causes the new authorization code, preceded by the address of the decoder to which the new code is being assigned, to be transmitted as control information in the interference signal. Again, a special pulse sequence preferably precedes the address to indicate to the decoders that the following pulses are addresses and new authorization codes rather than seeds.

As a modification of the foregoing approach, the control signals CONT 3-6 produced by the decoder can be generated as a function of only one rather than two numbers stored in the decoder, using the authorization code alone to control scrambling and unscrambling. In this case, the scrambling system uses that authorization code as the seed to control the pseudo-random scrambling.

As another modification, each new authorization code can be encrypted in a manner that depends upon the address of the decoder to which the new authorization code is being sent. The control information can also be encrypted using any suitable conventional encryption scheme.

To minimize any possibility of errors, it is preferred that the computer 20 continually transmit in sequence the addresses of all of the decoders in the system, each followed by the current authorization code of that decoder.

Figure 6:
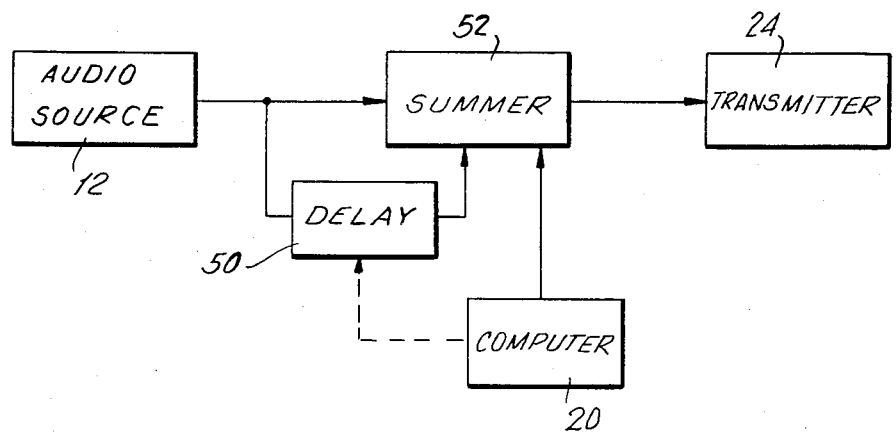
FIGS. 6 and 7 are schematic diagrams illustrating another method of practicing the invention, in which the program audio signal itself is used as the interference signal.
Figure 7:
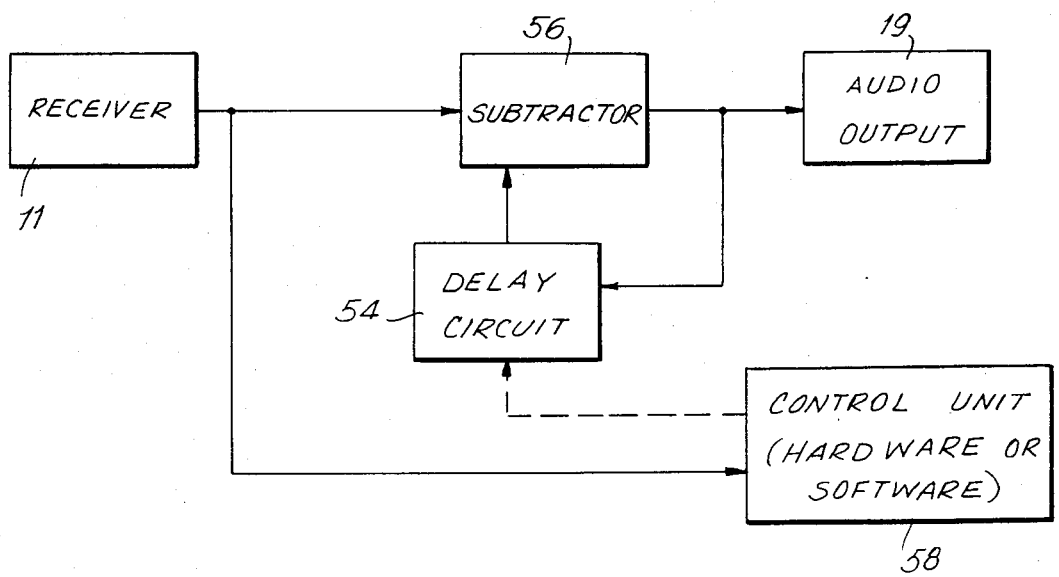

As an alternative to the foregoing embodiments, the program audio signal itself can be used as the interfering signal. In this case, illustrated in FIGS. 6 and 7, the program audio signal is passed through a delay circuit 50. The delayed audio signal is then added to the undelayed program audio signal by summer 52, in place of a separately generated noise signal. For unscrambling, the received audio signal is split into two parts, one of which is delayed by circuit 54 by a time equal to the delay used in the scrambling step. The undelayed, scrambled audio signal and the delayed audio signal are then subtracted by circuit 56, under the control of unit 58, to reproduce the original program audio signal.

In the embodiments described with reference to FIGS. 1-5, it is necessary that the noise signal be added only during specified, predetermined intervals (i.e., the intervals T indicated in FIG. 2), in order to leave intervals U for the transmission of the control information. Using the delayed program audio signal as the interfering signal, however, this is unnecessary, because there is no separate noise signal to be transmitted in parallel with the scrambled audio signal. Thus the control information can, if desired, be transmitted continuously on a selected subcarrier rather than only at specified times. As a result, the interference signal can be added to the program audio at any time.

In addition, the delay time and the strength of the fed-back delayed signal can, if desired, be varied pseudo-randomly as a function of the control information.

The invention can, if desired, be practiced entirely using software for encryption and decoding, in a manner that will be apparent to those skilled in the art.

The hardware, software or both required to practice the foregoing embodiments of the invention are believed to be well within the ordinary level of skill in the art, and will not be described.

Although the present invention has been particularly described with detailed reference to several preferred embodiments, many modifications and variations thereof will now be readily apparent skilled in the art. Accordingly, the scope of the invention is to be limited, not by the details of described herein, but only by the terms of the appended claims.

What is claimed is:

1. A method for secure transmission of an audio signal, comprising the steps of:
   generating a program audio signal;
   generating an interference signal;
   generating control information;
   varying the level of said interference signal as a function of said program audio signal;
   intermittently adding said interference signal to said program audio signal during predetermined periods of time to produce a scrambled signal;
   transmitting said scrambled signal on one carrier;
   simultaneously transmitting said interference signal on a second carrier; and
   transmitting said control information on said second carrier during at least one interval between the predetermined periods the interference signal is added to the program audio signal.

2. The method of claim 1, wherein said interference signal is added to said program audio signal as a pseudo-random function of time during said predetermined periods.

3. The method of claim 1, further comprising the step of phase-reversing said interference signal from time to time as a function of said control information, before adding said interference signal to said program audio signal.

4. The method of claim 3, wherein said interference signal is phase-reversed as a pseudo-random function of time.

5. The method of claim 1, wherein said interference signal is intermittently added to said program audio signal as a function of two predetermined numbers neither of which is selected as a function of the other, and wherein said step of transmitting said control information includes transmitting one of said two numbers together with an address identifying one decoder, for enabling that decoder to unscramble said scrambled signal.

6. The method of claim 1, wherein said step of transmitting said control information comprises transmitting said control information together with an address identifying one decoder, for enabling that decoder to unscramble said scramble signal.

7. An apparatus for scrambling an audio signal, comprising:
   means for generating an interference signal;
   means for generating control information;
   means for producing a scrambled signal by intermittently adding said interference signal to a program audio signal as a function of said control information;
   means for time-multiplexing said interference signal and said control information; and means for simultaneously transmitting the scrambled signal on one carrier, and the time-multiplexed interference signal and control information on a second carrier.

8. The apparatus of claim 7, further comprising means for phase-reversing the interference signal as a function of such control information.

9. A decoder for descrambling a scrambled audio signal, said decoder comprising:
   means for identifying time-multiplexed first and second portions of a first signal;
   means for processing the first portion of the first signal to produce control signals; and
   means for subtracting the second portion of the first signal from a scrambled signal at times determined as a function of the control signals.

10. The decoder of claim 9, further comprising memory means storing an authorization code, said means for processing the first portion of the first signal producing control signals as a function both of the authorization code and of information contained in the first portion of the first signal.

* * * * *

UNITED STATES PATENT AND TRADEMARK OFFICE
CERTIFICATE OF CORRECTION

PATENT NO. : 4,638,357         Page 1 of 2

DATED : January 20, 1987

INVENTOR(S) : Paul A. Heimbach

It is certified that error appears in the above-identified patent and that said Letters Patent is hereby corrected as shown below:

Cover Page, References cited,

After "4,081,832   3/1978 Sherman" insert

--4,099,203   7/1978 Garodnick et al....358/118

4,145,717   3/1979 Guif et al....358/121

4,148,063   4/1979 Chomet ....358/114

4,181,816 1/1980 Vasseur....178/22--

After "4,215,366   7/1980 Davidson....358/121" insert

--4,221,931 9/1980 Seiler....179/1.5R--

After "4,222,067 9/1980 Stern et al....358/118" insert

--4,245,245   1/1981 Matsumoto et al....358/122

4,245,246 1/1981 Cheung....358/124

4,253,114 2/1981 Tang et al....358/114

UNITED STATES PATENT AND TRADEMARK OFFICE
CERTIFICATE OF CORRECTION

PATENT NO. : 4,638,357    Page 2 of 2

DATED : January 20, 1987

INVENTOR(S) : Paul A. Heimbach

It is certified that error appears in the above-identified patent and that said Letters Patent is hereby corrected as shown below:

After "4,266,243  5/1981 Shutterly . " insert

--4,278,840  7/1981 Morgan et al....179/1.5 S--

Signed and Sealed this

Fourth Day of October, 1988

Attest:

DONALD J. QUIGG

Attesting Officer    Commissioner of Patents and Trademarks